UNITED STATES PATENT OFFICE.

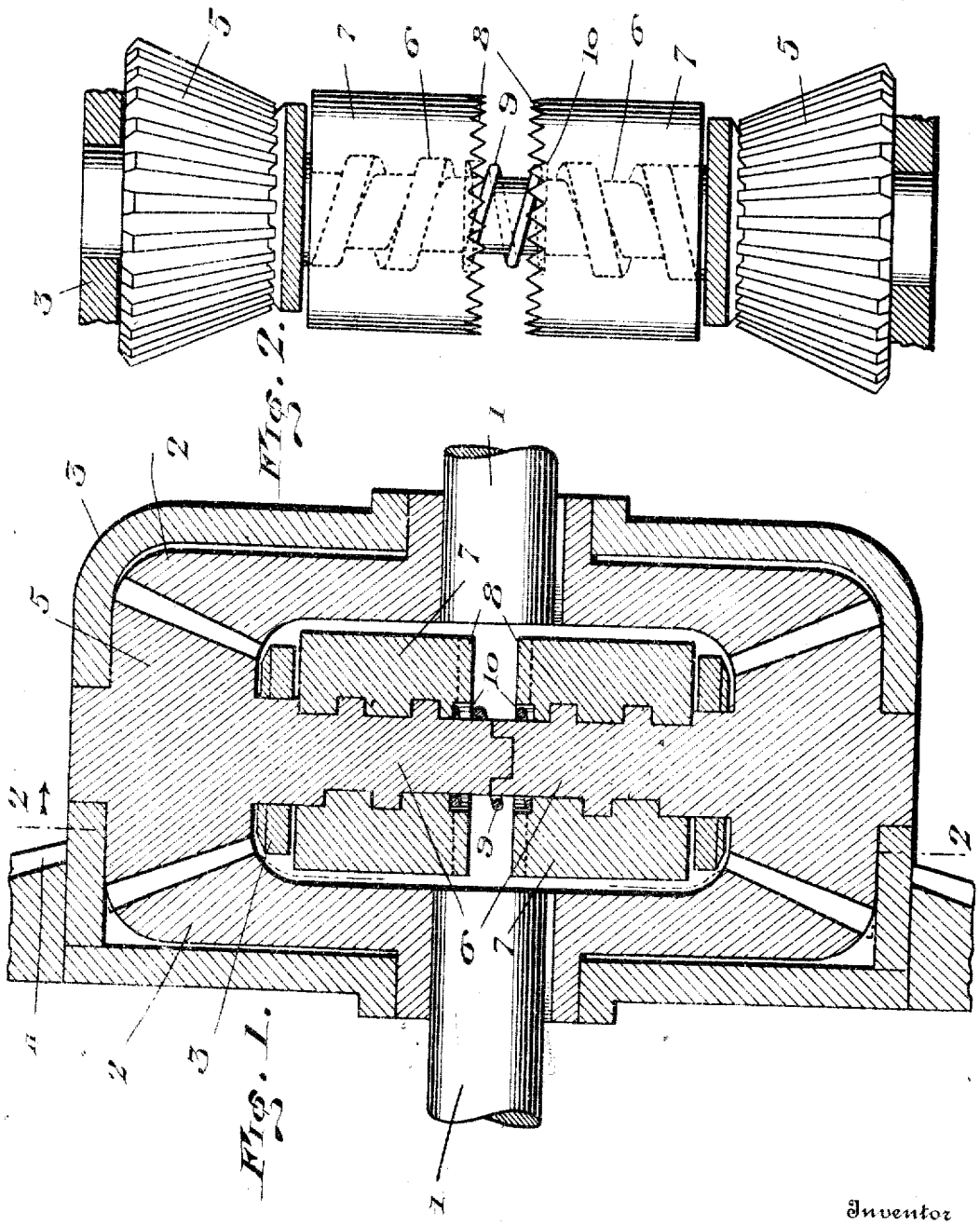

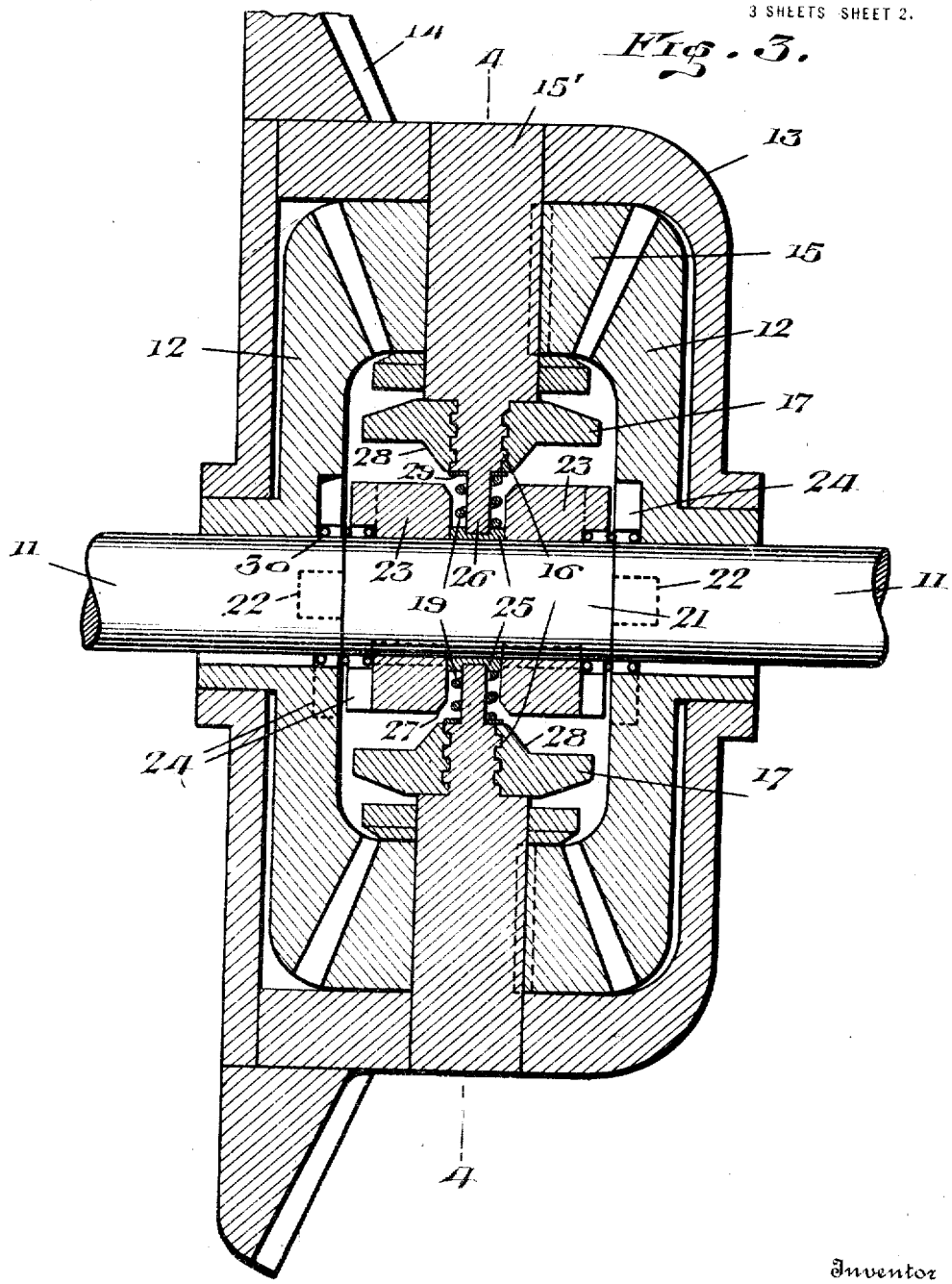

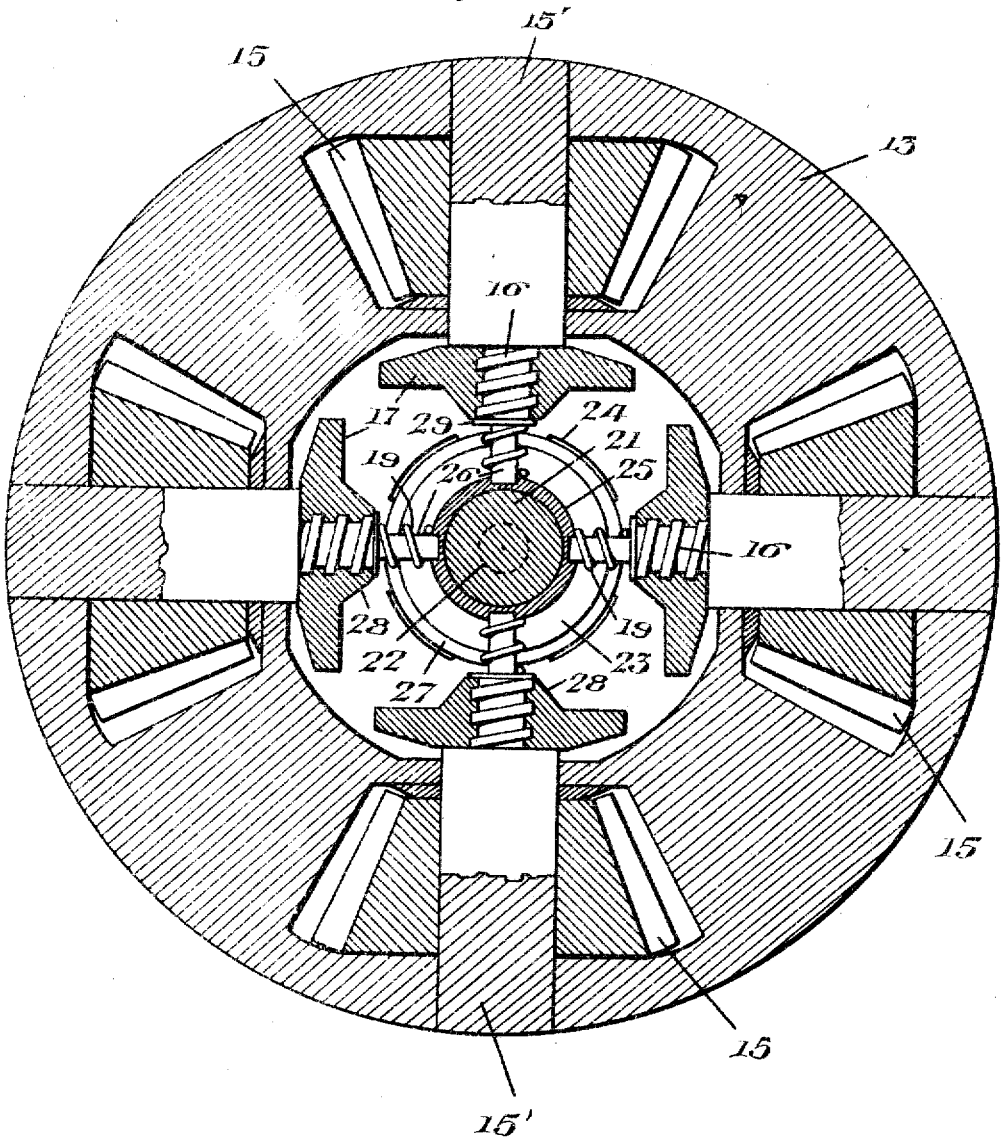

KENNETH P. MacDONALD, OF LINCOLN, NEBRASKA.

AUTOMATIC SELF-LOCKING DIFFERENTIAL GEARING.

1,341,276. Specification of Letters Patent. Patented May 25, 1920.

Application filed June 23, 1919. Serial No. 306,007.

*To all whom it may concern:*

Be it known that I, KENNETH P. MACDONALD, a citizen of the United States, residing at Lincoln, in the county of Lancaster and State of Nebraska, have invented certain new and useful Improvements in Automatic Self-Locking Differential Gearing; and I do hereby declare the following to be a full, clear, and exact description of the invention, such as will enable others skilled in the art to which it appertains to make and use the same.

The present invention relates to differential gearing such as used in automobiles and other machines for driving two propelling wheels or other driven elements from a common driving shaft or member.

It is the object of the invention to provide a differential gearing which will ordinarily distribute the power from the driving member to the driven members as needed, rotating one driven member faster or slower than the other, or driving both members at the same speed, and which gearing is provided with improved features of construction operable for automatically locking both of the driven members together so as to rotate as a unit, when there is a tendency for either driven member to spin in one direction or the other, due to the freeing of one driven member, such as the disengagement of the propelling wheel from the ground, or the like.

A further object is the provision of such a mechanism which will lock the driven members together when there is an abnormal difference in speed between the driven members, such as when one driven member has a tendency to spin or rotate at an exceedingly high speed, whereas the mechanism leaves the driven members free to rotate relatively at normal differences in speed, as when turning corners. In this way, there is a perfect compensation and equal distribution of the engine power to the driven members in all conditions, when there is only legitimate or normal difference in speed for rotation of the driven members or wheels, whereas an abnormal increase of speed in either driven member will lock said driven members together whereby they will both be rotated as a unit from the driving member, thereby preventing the spinning of the driven member which may be released or freed for any reason whatever, and thus avoiding the waste of power and propulsion of the remaining driven member which is active.

It is also the object of the invention to embody such improvements in differential gearing of prevailing form, and in a simple and inexpensive yet efficient and practical manner.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a diametrical section of a simple differential gearing showing the improvements embodied therein.

Fig. 2 is an elevation of the planetary pinions and clutch members.

Fig. 3 is a view similar to Fig. 1 showing the improvements incorporated in a different form of gearing.

Fig. 4 is a section on the line 4—4 of Fig. 3, portions being shown in elevation.

In Figs. 1 and 2, a simple form of differential gearing is shown, being of the conventional type, and including the axle sections or driven shafts or members 1 on the adjacent ends of which are keyed the gear wheels 2. A rotatable member 3 inclosing said gear wheels is mounted for rotation on the hubs thereof, and has a gear 4 for connecting the differential gearing with a driving shaft, the member 3 constituting the driving member of the gearing and carrying a pair of diametrically opposite planetary pinions 5 meshing with the opposite gear wheels 2, thus distributing the power from the driving member to the driven members or shafts 1 with a differential and compensating action, as well known.

In order to lock the driven members 1 together when there is a tendency for either of them to spin or rotate at a higher speed than normally required in turning corners or the like, the pinions 5 have inwardly extending screws or threaded spindles 6 projecting toward one another and preferably having their adjacent ends provided with a swivel connection as seen in Fig. 1. One of the screws is right handed, and the other left handed, and on each of said screws is threadedly mounted a clutch member or nut 7 adapted to turn freely on the screw, and of sufficient weight or bulk that the momentum will tend to prevent either of said members 7 from turning with the corresponding screw should said screw spin suddenly. The adjacent ends of the members 7 are preferably provided with clutch teeth 8 to provide a positive grip between said clutch members, and said members are normally separated by a coiled wire expansion spring 9 surrounding the screws 6 and confined between said clutch members, the adjacent ends of which have recesses 10 for receiving said spring. This spring 9 is of sufficient tension to hold said clutch members apart during normal operation, preventing either clutch member from being moved inwardly by screw action due to the rotation of the pinions 5, unless there is a sudden abnormal increase in the speed of said pinions.

In operation, the gearing will perform as usual, the members 7 rotating with the pinions 5 and their screws 6, and the spring 9 holding said clutch members apart against any tendency for them to travel inwardly on the screws. Should there be an abnormal increase in speed of either driven member or shaft 1, this will increase the speed of rotation of the pinions 5 about their axes, and the sudden increase in rotational speed of the screws 6 will cause one of the clutch members to move inwardly into engagement with the opposite clutch member, thereby preventing the further rotation of the pinions 5 with respect to one another, and therefore locking the members or shafts 1 together, so that they will turn as a unit. In view of the fact that one screw is right handed, and the other left handed, one of the clutch members will be forced inwardly should the pinions 5 rotate at an abnormal speed in either direction, due to the spinning of one member 1 or the other, and such action will occur during the rotation of the members 1 in either direction as when moving forwardly or rearwardly. The reverse screws provide for the locking of the gearing by the rotation of either member 1 at a high speed compared with the other, and in either direction of rotation. Ordinarily, when both members 1 rotate at about the same speed, the pinions 5 travel around with the member 3 and gear wheels 2, but inasmuch as the gear wheels 2 do not have much relatively rotational speed, the pinions 5 have only a slow rotation about their axes. Thus, when turning corners, one member 1 will rotate faster than the other, so that the pinions 5 rotate upon their axes, but their speed of rotation is normal or comparatively slow, whereas should one of these members 1 be freed or released, said pinions 5 will at once spin and rotate said member 1 at a high or abnormal speed. When this occurs, the sudden increase in speed of the pinions 5 and their screws 6, will cause the corresponding clutch member 7 to be forced inwardly by the active screw 6, the momentum of such clutch member preventing it from turning suddenly with the screw, so that the screw turns within said clutch member and forces it inwardly into engagement with the opposite clutch member against the tension of the spring 9. The engagement of the clutch members locks the pinions 5 together, thereby locking the gear wheels 2 and members 1 together as a unit, and not only preventing the freed member 1 from spinning, but also applying all the power to the other member 1, or to both of said members as needed or required. This condition will be maintained as long as there is a tendency for either member 1 to spin with respect to the other, inasmuch as the tendency for the pinions 5 to spin will hold the clutch members in engagement, but as soon as the tendency for members 1 to spin relatively has passed the spring 9 will come into play and separate the clutch members thereby releasing the driven members 1 for normal operation. Centrifugal force will also assist the spring 9 in moving the clutch members outwardly to normal position away from one another, especially when the driving member 3 rotates at a high speed, the spring 9 being used to assure of such return of the clutch members under all conditions. As a result of using the present construction, the gearing will operate as usual under normal conditions, and the driven members will be locked together whenever and as long as there is a tendency for either driven member to spin or rotate at an abnormal speed with respect to the other, so that both driven members will be operated as a unit from the driving member, and said driven members will be automatically unlocked or released from one another when normal conditions are restored.

In Figs. 3 and 4, the improvements are shown in a slightly different embodiment in another type of differential gearing having the driven members or shafts 11, gear wheels 12 secured thereon, driving member 13 with its gear 14, and planetary pinions 15 carried by said member 13 and meshing with the gear wheels 12. In view of the use of four pinions 15, a simple arrangement shown in Figs. 1 and 2 cannot be used, unless with only two of the pinions, and as a means for utilizing all four or more pinions 15, the inner end of the spindle or axle 15' of each pinion 15 is provided with a reduced inwardly extending screw 16. The screws of the opposite pinions are of the same thread, and the screws of one pair are right handed, and of the other pair are left handed, so that the members or nuts 17 on said screws operate in pairs at opposite sides of the axis of the driven members 11. These members 17 normally come to rest against the shoulders at the inner ends of the spindles 15'.

With this modified arrangement, a short shaft 21 is disposed between the members 11 and has its ends swiveled within the members 11 as at 22, to support said shaft or member 21, and clutch members or sleeves 23 are slidable on the shaft 21 and are feathered thereon so that said clutch members cannot rotate relatively, but can slide toward and away from one another. The opposite ends of said clutch members and adjacent sides of the gear wheels 12 have clutch teeth or portions 24 to interengage when said clutch members are separated, thereby locking both of the gear wheels 12 to the shaft or member 21, so that said gear wheels and members 11 will not rotate relatively. A ring or collar 25 is fitted on the shaft 21 between the clutch members 23, and the screws 16 have stems or fingers 26 extending therefrom and engaging within recesses in said ring or collar 25. Coiled wire expansion springs 19 surround the fingers 26 and are confined between the ring 25 and washers 29 slidable on said fingers, and the members 17 have conical wedges 28 extending from their inner sides and bearing against the washers 29. The adjacent sides of the clutch members 23 are beveled as at 27, for the engagement of the wedges 28 between the clutch members to separate them. The clutch members 23 are normally moved toward one another against the ring 25 by means of springs 30 confined between the clutch members and gear wheels 12, and the springs 19 normally move the members 17 outwardly with the washers 29.

Under normal conditions, the members 11 can rotate at different speeds, and at varying low speeds of the pinions 15, the members 17 will simply turn with the screws 16, but should either shaft or member be freed so as to spin, one pair of members 17 will be moved inwardly toward one another by the screw action, thus forcing their wedges 28 between the clutch members 23, and separating said clutch members to move them into engagement with the gear wheels 12, thus locking said gear wheels and members 11 together to rotate as a unit. This locking of the parts will be maintained as long as there is a tendency for either member 11 to rotate at a high speed relatively to the other, and when normal conditions are restored, the parts will return to normal position. When the members 17 move inwardly, the washers 29 are moved likewise, thereby compressing the springs 19, which will return members 17 back to initial position as soon as the tendency for spinning is removed, and the springs 30 return the clutch members 23 thereby unlocking the gearing by disconnecting the gear wheels 12 from the coupling member or shaft 21.

Having thus described the invention, what is claimed as new is:—

1. Differential gearing embodying a pair of driven members, planetary pinions located operatively between them, clutch means for connecting the driven members including members rotatable with said pinions, and means whereby the excessive speed of rotation of said pinions will move one of said members along its axis of rotation to bring the clutch into action.

2. Differential gearing embodying a pair of driven members, planetary pinions located operatively between them, a clutch for connecting the driven members including rotatable members movable along their axes for bringing the clutch into and out of action, and means operatively connecting said clutch members and pinions for rotating said members with the pinions and upon excessive speed of the pinion to move one of said members axially to bring the clutch into action.

3. Differential gearing embodying a pair of driven members, planetary pinions located operatively between them, a clutch for connecting the driven members, and a screw connection between the clutch and pinions for bringing the clutch into action upon an abnormal relative rotation of said members.

4. Differential gearing embodying a pair of driven members, planetary pinions located operatively between said members, a screw movable with each of said pinions, and clutch means to connect said driven members including an operative member threaded on each screw to be moved operatively by abnormal speed of said pinions.

5. Differential gearing embodying a pair of driven members, planetary pinions located operatively between them, and independent means operated by said pinions in the opposite directions of rotation for limiting the relative rotational speed of said driven members in either direction.

6. Differential gearing embodying a pair of driven members, planetary pinions located operatively between said members, clutch means for locking the driven members together to rotate as a unit, and independent means operated by said pinions in reverse directions of rotation for bringing the clutch means into action in either direction of rotation.

7. Differential gearing embodying a pair of driven members, planetary pinions located operatively between them, reverse screws carried by said pinions, and clutch means for locking the driven members together including members threaded on said screws to be moved operatively thereby by the excessive relative rotational speed of the driven members in either direction.

8. Differential gearing embodying members capable of relative rotation, a member rotated by the relative rotation of the said members, and having a screw, and means for limiting the relative rotation of the first named members including a member threaded on said screw to be moved operatively thereby by abnormal speed of the screw.

9. Differential gearing including a pair of members capable of relative rotation, a member rotated by such relative rotation of said members and having a screw, and clutch means for locking the first named members together to rotate as a unit including a member threaded on said screw to normally turn therewith and movable operatively by the screw due to its excessive speed.

In testimony whereof I have signed my name to this specification in the presence of two subscribing witnesses.

KENNETH P. MacDONALD.

Witnesses:
GRACE J. KILLIP,
M. L. EASTERDAY.